United States Patent
Nakazawa (10) Patent No.: US 11,492,577 B2
(45) Date of Patent: Nov. 8, 2022

(54) METHOD FOR MANUFACTURING BREWED ALCOHOLIC BEVERAGE USING POROUS MEMBRANE

(71) Applicant: ASAHI KASEI KABUSHIKI KAISHA, Tokyo (JP)

(72) Inventor: Yukio Nakazawa, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 349 days.

(21) Appl. No.: 16/644,358

(22) PCT Filed: Sep. 4, 2018

(86) PCT No.: PCT/JP2018/032744
§ 371 (c)(1),
(2) Date: Mar. 4, 2020

(87) PCT Pub. No.: WO2019/049861
PCT Pub. Date: Mar. 14, 2019

(65) Prior Publication Data
US 2021/0040424 A1 Feb. 11, 2021

(30) Foreign Application Priority Data
Sep. 7, 2017 (JP) .............................. JP2017-172007

(51) Int. Cl.
| | | |
|---|---|---|
| *B01D 65/02* | (2006.01) | |
| *B01D 69/02* | (2006.01) | |
| *B01D 69/08* | (2006.01) | |
| *B01D 71/34* | (2006.01) | |
| *B01D 71/36* | (2006.01) | |
| *C12H 1/07* | (2006.01) | |
| *B01D 71/68* | (2006.01) | |

(52) U.S. Cl.
CPC ............ *C12H 1/063* (2013.01); *B01D 65/02* (2013.01); *B01D 69/02* (2013.01); *B01D 69/08* (2013.01); *B01D 71/34* (2013.01); *B01D 71/36* (2013.01); *B01D 71/68* (2013.01); *B01D 2311/02* (2013.01); *B01D 2311/2688* (2013.01); *B01D 2321/162* (2013.01); *B01D 2321/164* (2013.01); *B01D 2325/02* (2013.01); *B01D 2325/24* (2013.01)

(58) Field of Classification Search
CPC ........ B01D 69/02; B01D 69/08; B01D 65/02; B01D 2325/02
See application file for complete search history.

(56) References Cited

U.S. PATENT DOCUMENTS

| | | | |
|---|---|---|---|
| 2002/0056682 A1* | 5/2002 | Taniguchi ............. | B01D 63/06 264/561 |
| 2003/0232184 A1 | 12/2003 | Morikawa et al. | |
| 2007/0056904 A1 | 3/2007 | Hogt et al. | |
| 2010/0133184 A1 | 6/2010 | Gojo et al. | |
| 2010/0219122 A1 | 9/2010 | Ogawa et al. | |
| 2011/0165308 A1 | 7/2011 | Shiki | |
| 2011/0239865 A1 | 10/2011 | Huang et al. | |
| 2019/0022601 A1 | 1/2019 | Kaisha | |
| 2020/0206693 A1* | 7/2020 | Okamura ............... | B01D 71/34 |

FOREIGN PATENT DOCUMENTS

| | | | |
|---|---|---|---|
| CN | 1816384 A | 8/2006 | |
| CN | 102164656 A | 8/2011 | |
| EP | 1 517 741 | 3/2005 | |
| EP | 2 022 555 A1 | 2/2009 | |
| EP | 1517741 B1 * | 3/2009 | ............ B01D 65/02 |
| JP | H5-301034 | 11/1993 | |
| JP | H9-117275 | 5/1997 | |
| JP | 2011-168741 | 9/2011 | |
| JP | 2012-040461 A | 3/2012 | |
| JP | 2012-511413 | 5/2012 | |
| WO | 03/095078 A1 | 11/2003 | |
| WO | 2009/051168 | 4/2009 | |
| WO | 2017/155004 | 9/2017 | |

OTHER PUBLICATIONS

ISR and WO issued in WIPO Patent Application No. PCT/JP2018/032744, dated Nov. 27, 2018, English translation.
IPRP issued in WIPO Patent Application No. PCT/JP2018/032744, dated Mar. 10, 2020, English translation.
Supplementary European Search Report, EPO, Application No. 18854325.0, dated Oct. 1, 2020.

* cited by examiner

*Primary Examiner* — Bradley R Spies
(74) *Attorney, Agent, or Firm* — Greenblum & Bernstein, P.L.C.

(57) ABSTRACT

Provided is a method for manufacturing a long-life brewed alcoholic beverage by a filtration process with the use of a porous membrane involving a washing step, whereby a high tolerance (chemical tolerance) to a washing solution (a chemical solution) and a good filtration performance are achieved. A method for ma manufacturing a second brewed alcoholic beverage which includes: a filtration step for passing a first brewed alcoholic beverage, which contains a yeast and a high-molecular substance or sediment component produced through fermentation by the yeast, through a porous membrane, which is formed of a resin having a three-dimensional network structure, to thereby separate the second brewed alcoholic beverage from the yeast; and a washing step for passing a washing solution through the porous membrane or immersing the porous membrane in the washing solution to thereby wash the inside of the porous membrane.

7 Claims, 5 Drawing Sheets

METHOD FOR MANUFACTURING BREWED ALCOHOLIC BEVERAGE USING POROUS MEMBRANE

FIELD

The present invention relates to a method for manufacturing a brewed alcoholic beverage using a porous membrane and comprising a washing step. More specifically, the present invention relates to a filtration method with excellent tolerance for a washing solution (chemical solution) wherein the filtration method uses a porous membrane and comprises a washing step.

BACKGROUND

For water treatment for obtaining drinkable water and industrial-use water from natural water sources, such as sea water, river water, lake water, and groundwater which are suspended water, for sewage treatment for treating sewage water and other waste water to manufacture recycled water as clear water that can be released, and for removing yeast from a brewed alcoholic beverage made by fermenting a solution containing a saccharide with yeast, and removing a sediment component such as high-molecular substances, proteins, polyphenols, and tannins produced by the yeast, a solid-liquid separation operation (turbidity removal operation) for separating and removing suspended particles is necessary. In the turbidity removal operation, with regards to water treatment, suspended particles (clay, colloids, bacteria, etc.) originating from natural source water which are water suspensions are removed, and with regards to sewage treatment, suspended particles in the sewage water and suspended particles (mud, etc.) in water biologically treated (secondary treatment) with activated sludge are removed. Conventionally, turbidity removal operations for brewed alcoholic beverages such as wine were performed by a diatomaceous earth filtration method, but in recent years, a membrane filtration method has become more common, replacing these methods.

Conventionally, these turbidity removal operations were mainly performed by a pressure floatation method, a sedimentation method, a sand filtration method, a coagulated sedimentation sand filtration method, or a diatomaceous earth filtration method. However, in recent years, a membrane filtration method has become more common, replacing these other methods. The merits of membrane filtration are (1) the turbidity removal level in the obtained water quality is high and steady (the obtained water is very safe), (2) the space taken up by the filtration device facilities is small, and (3) automatic operation is easy. For example, in the pretreatment of seawater desalination reverse osmosis filtration, as a replacement method for the pressure floatation method or as a step following the pressure floatation method, membrane filtration is used to further improve the water quality of water treated by pressure floatation. In the turbidity removal operations using these membrane filtration processes, a flat membrane having an average pore diameter in the range of nanometers to hundreds of nanometers, or a hollow fiber porous ultrafiltration membrane or microfiltration membrane is used.

Thus, a turbidity removal operation via membrane filtration has many merits not found in the conventional pressure floatation method or sand filtration method above, and therefore, has become more common as a means which replaces or complements conventional methods in sea water desalination pretreatment. Additionally, organic membranes consisting of a resin such as the one described in PTL 1 below are frequently used as porous membranes.

CITATION LIST

Patent Literature

[PTL 1] Japanese Unexamined Patent Publication (Kokai) No. 2011-168741

SUMMARY

Technical Problem

As described above, organic membranes consisting of a resin are frequently used as porous membranes, but when making a porous filtration membrane from a resin material, differences in the microstructure of the material constituting the membrane arise depending on the film-forming method. Normally, since the membrane clogs as the filtration operation continues, a washing step accompanies the operation of a filtration method in which a porous filter membrane is used. Yet, if a chemical is used in the washing step, deterioration of the membrane strength is induced. Thus, there is the problem that, if the microstructures of the material composing the porous filtration membrane are different, the extent of damage to the porous filtration membrane due to the washing solution (chemical solution) used in repeated washing steps differs, and as a result, filtration performance and lifetime are affected.

Out of consideration of this problem, the object which the present invention aims to achieve is to provide a method resulting in excellent chemical toleration, excellent filtration performance and long life as a method for manufacturing a brewed alcoholic beverage comprising a filtration step which uses a porous filtration membrane and comprises a washing step in which a washing solution (chemical solution) is used.

Solution to Problem

As a result of keen evaluation and repeated experiments to achieve the above object, the present inventors surprisingly discovered that by using a membrane with good pore communication from the inside of the membrane, which is the to-be-treated solution side of the porous filtration membrane, to the outside of the membrane, which is the filtrate side, even when using an aqueous solution comprising 0.01 wt % to 0.5 wt % of sodium hypochlorite or 0.1 wt % to 1 wt % of a peroxide as the washing solution (chemical solution) used in the washing step, deterioration of the membrane can be suppressed to a minimum, and thereby completed the invention.

Essentially, the present invention is the following.

[1] A method for manufacturing a second brewed alcoholic beverage, comprising:

a filtration step for passing a first brewed alcoholic beverage, which contains a yeast and a high-molecular substance or sediment component produced through fermentation by the yeast, through a porous membrane, which is formed of a resin having a three-dimensional network structure, to thereby separate a second brewed alcoholic beverage from the yeast; and a washing step for passing a washing solution through the porous membrane or immersing the porous membrane in the washing solution to thereby wash the inside of the porous membrane;

wherein, in an SEM image of a cross section along the membrane thickness direction of the porous membrane perpendicular to the inside surface of the porous membrane, in each region of a total 4 views: a view comprising the inside surface, a view comprising an outside surface of the membrane, and two views photographed at equal intervals therebetween, the sum total of the areas of resin parts with an area of 1 $\mu m^2$ or less amounts to 70% or more relative to the overall area of resin parts;

the washing solution is an aqueous solution containing 0.01 wt % to 0.5 wt % of sodium hypochlorite, or 0.1 wt % to 1 wt % of a peroxide;

and in the washing step, the yeast attached to the porous membrane, and a high-molecular substance or sediment component contained in the first brewed alcoholic beverage are removed.

[2] A method for manufacturing a second brewed alcoholic beverage, comprising:

a filtration step for passing a first brewed alcoholic beverage, which contains a yeast and a high-molecular substance or sediment component produced through fermentation by the yeast, through a porous membrane, which is formed of a resin having a three-dimensional network structure, to thereby separate a second brewed alcoholic beverage from the yeast; and a washing step for passing a washing solution through the porous membrane or immersing the porous membrane in the washing solution to thereby wash the inside of the porous membrane;

wherein, in an SEM image of a cross section along the membrane thickness direction of the porous membrane perpendicular to the inside surface of the porous membrane, in each region of a total 4 views: a view comprising the inside surface, a view comprising an outside surface of the membrane, and two views photographed at equal intervals therebetween, the sum total of the areas of resin parts with an area of 10 $\mu m^2$ or larger amounts to 15% or less relative to the total area of resin parts;

the washing solution is an aqueous solution containing 0.01 wt % to 0.5 wt % of sodium hypochlorite, or 0.1 wt % to 1 wt % of a peroxide;

and in the washing step, the yeast attached to the porous membrane, and a high-molecular substance or sediment component contained in the first brewed alcoholic beverage are removed.

[3] A method for manufacturing a second brewed alcoholic beverage, comprising the following process:

a filtration step for passing a first brewed alcoholic beverage, which contains a yeast and a high-molecular substance or sediment component produced through fermentation by the yeast, through a porous membrane, which is formed of a resin having a three-dimensional network structure, to thereby separate a second brewed alcoholic beverage from the yeast; and a washing step for passing a washing solution through the porous membrane or immersing the porous membrane in the washing solution to thereby wash the inside of the porous membrane;

wherein, in an SEM image of a cross section along the membrane thickness direction of the porous membrane perpendicular to the inside surface of the porous membrane, in each region of a total 4 views: a view comprising the inside surface, a view comprising an outside surface of the membrane, and two views photographed at equal intervals therebetween, the sum total of the areas of resin parts with an area of 1 $\mu m^2$ or less amounts to 70% or more relative to the overall area of resin parts and the sum total of the areas of resin parts with an area of 10 $\mu m^2$ or larger amounts to 15% or less relative to the total area of resin parts;

the washing solution is an aqueous solution containing 0.01 wt % to 0.5 wt % of sodium hypochlorite, or 0.1 wt % to 1 wt % of a peroxide;

and in the washing step, the yeast attached to the porous membrane, and a high-molecular substance or sediment component contained in the first brewed alcoholic beverage are removed.

[4] The method of any one of [1] to [3], wherein in an SEM image of a cross section along the membrane thickness direction of the porous membrane perpendicular to the inside surface of the porous membrane, in each region of a total 4 views: a view comprising the inside surface, a view comprising an outside surface of the membrane, and two views photographed at equal intervals therebetween, the sum total of the areas of resin parts with an area of more than 1 $\mu m^2$ and less than 10 $\mu m^2$ is 15% or less relative to the total area of resin parts.

[5] The method of any one of [1] to [4], wherein the surface area opening ratio of the porous membrane is 25 to 60%.

[6] The method of any one of [1] to [5], wherein the relationship between the tensile breaking elongation of the porous membrane before the washing step E0 and the tensile breaking elongation of the porous membrane after the washing step E1 is E1/E0×100≥98%.

[7] The method of any one of [1] to [5], wherein the relationship between the tensile breaking elongation of the porous membrane before the washing step E0 and the tensile breaking elongation of the porous membrane after the washing step is repeated X times (where X is an integer from 2 to 10) EX is EX/E0×100≥97%.

[8] The method of any one of [1] to [7], wherein the relationship between the flux of the porous membrane before the filtration step L0 and the flux of the porous membrane after the washing step L1 is L1/L0×100≥80%.

[9] The method of any one of [1] to [7], wherein the relationship between the flux of the porous membrane before the filtration step L0 and the flux of the porous membrane after the washing step is repeated X times (where X is an integer from 2 to 10) LX is LX/L0×100≥80%.

[10] The method of any one of [1] to [9], wherein the porous membrane is a hollow fiber membrane.

[11] The method of any one of [1] to [10], wherein a resin composing the porous membrane is a thermoplastic resin.

[12] The method of [11], wherein the thermoplastic resin is a fluororesin.

[13] The method of [12], wherein the fluororesin is selected from a group of vinylidene fluoride resin (PVDF), chlorotrifluoroethylene resin, tetrafluoroethylene resin, ethylene-tetrafluoroethylene copolymer (ETFE), ethylene-monochlorotrifluoroethylene copolymer (ECTFE), hexafluoropropylene resin, and mixtures thereof.

[14] The method of [11], wherein the thermoplastic polymer is polysulfone (PS) or polyether sulfone (PES).

[15] The method of any one of [1] to [14], wherein the high-molecular substance is selected from a group of proteins, polysaccharides, and complexes thereof.

[16] The method of any one of [1] to [14], wherein the sediment component is a substance made by complexing a protein, a polyphenol, and/or a tannin via fermentation.

[17] The method of any one of [1] to [16], further comprising a rinsing step in which, after the washing step, the washing solution remaining inside the porous membrane is rinsed with rinse water, wherein the amount of the rinse water used is 50 L/m² or less per unit area of the porous membrane, and the washing solution is an aqueous solution comprising 0.2 wt % to 0.5 wt % of sodium hypochlorite or 0.5 wt % to 1 wt % of a peroxide.

[18] The method of [17], wherein the chlorine concentration at the time of completion of the rinsing step is 0.1 ppm or less, in the case that the peroxide is hydrogen peroxide, the hydrogen peroxide concentration is 5 ppm or less, and, in the case that the peroxide is a percarbonate or a persulfate, the concentration of the percarbonate or the persulfate is 5 ppm or less.

Advantageous Effects of Invention

Since the filtration step in the method for manufacturing a brewed alcoholic beverage according to the present invention uses a membrane with good pore communication from the inside of the membrane, which is the to-be-treated solution side of the porous filtration membrane, to the outside of the membrane, which is the filtrate side, even when using an aqueous solution comprising 0.01 wt % to 0.5 wt % of sodium hypochlorite and/or 0.1 wt % to 1 wt % of a peroxide as the washing solution (chemical solution) used in the washing step, deterioration of the membrane can be suppressed to a minimum, and thus, the method is a method featuring excellent chemical tolerance, excellent filtration performance and long life as a method for manufacturing a brewed alcoholic beverage which uses a porous filtration membrane and comprises a washing step in which an aqueous solution comprising 0.01 wt % to 0.5 wt % of sodium hypochlorite or 0.1 wt % to 1 wt % of a peroxide is used.

DESCRIPTION OF EMBODIMENTS

The embodiment of the present invention (hereinafter referred to as "the present embodiment") will be specifically described below. However, the present invention is not limited to the present embodiment.
<Filtration Method>

The method for manufacturing a second brewed alcoholic beverage of the present embodiment comprises:

a filtration step for passing a first brewed alcoholic beverage, which contains a yeast and a high-molecular substance or sediment component produced through fermentation by the yeast, through a porous membrane, which is formed of a resin having a three-dimensional network structure, to thereby separate a second brewed alcoholic beverage from the yeast; and a washing step for passing a washing solution through the porous membrane or immersing the porous membrane in the washing solution to thereby wash the inside of the porous membrane.

The form of the porous membrane is not particularly limited, and can be a flat membrane, a tubular membrane, or a hollow fiber membrane, but from the perspective of conserving space of the filtration device, i.e., in order to maximize the membrane area per membrane module unit volume, a hollow fiber membrane is preferable.

The filtration step in the method for manufacturing a brewed alcoholic beverage of the present embodiment can be, for example, an internal pressure type of filtration step, in which a first brewed alcoholic beverage comprising yeast and a high-molecular substance or sediment component produced by fermentation by the yeast is supplied to the hollow part (inside surface) of the porous hollow fiber membrane, and passed through the membrane thickness (wall thickness) part of the porous hollow fiber membrane, and a liquid seeping from the outside surface of the porous hollow fiber membrane is collected as a second brewed alcoholic beverage; or an external pressure type of filtration step, in which a first brewed alcoholic beverage comprising yeast and a high-molecular substance or sediment component produced by fermentation by the yeast is supplied from the outside surface of the porous hollow fiber membrane, and a second brewed alcoholic beverage seeping from the inside surface of the porous hollow fiber membrane is collected through the hollow part.

In the present specification, the phrase "inside of the porous membrane" refers to the membrane thickness (wall thickness) part in which many pores are formed.

The washing step in the filtration method of the present embodiment comprises a washing step of passing an aqueous solution (washing solution) comprising 0.01 wt % to 0.5 wt % of sodium hypochlorite or 0.1 wt % to 1 wt % of a peroxide through the porous membrane or immersing the porous membrane in the aqueous solution to wash the inside of the porous membrane. The washing step can comprise a washing solution step in which washing is performed with the washing solution, and a rinse step in which the porous membrane is subsequently rinsed with rinse water to remove residual washing solution substances.

The washing step can be back pressure water washing, in which a washing solution is passed in the opposite direction of the direction of flow of the first brewed alcoholic beverage in the filtration step, i.e., from the side of the second brewed alcoholic beverage to the side of the first brewed alcoholic beverage, thereby separating and removing adhered substances (yeast, a high-molecular substance or sediment component contained in the first brewed alcoholic beverage) from the filtration surface (surface of supply side of a first brewed alcoholic beverage); or air scrubbing, in which the porous membrane is shaken by air and adhered substances on the porous membrane are shaken off. The amount of rinse water used in the rinse step is preferably 100 L/m$^2$ or less per unit area of the porous membrane, or more preferably 50 L/m$^2$. It is preferable that the chlorine concentration at the time of completion of the rinsing step is 0.1 ppm or less, in the case that the peroxide is hydrogen peroxide, the hydrogen peroxide concentration is 5 ppm or less, and, in the case that the peroxide is a percarbonate or a persulfate, the concentration of the percarbonate or the persulfate is 5 ppm or less.

The "rinse water" is not particularly limited, and can be tap water, deionized water, or well water.

In the present embodiment, an aqueous solution comprising 0.01 wt % to 0.5 wt % of sodium hypochlorite or 0.1 wt % to 1 wt % of a peroxide is used as a washing solution (chemical solution). The concentration of peroxide (oxidizing agent) in the washing solution (chemical solution) is preferably 0.2 wt % to 1 wt %, or more preferably 0.5 wt % to 1 wt %. The concentration of sodium hypochlorite in the washing solution (chemical solution) is preferably 0.1 wt % to 0.5 wt %, or more preferably 0.2 wt % to 0.5 wt %. By using the aqueous solution above, a high washing effect can be obtained in the washing for removed of adhered substances (yeast and high-molecular substances or sediment components included in a first brewed alcoholic beverage) from the filtration surface of the porous membrane (the surface of the supply side of the first brewed alcoholic beverage).

By using an aqueous solution comprising 0.01 wt % to 0.5 wt % of sodium hypochlorite, or 0.1 wt % to 1 wt % of a peroxide as the washing solution (chemical solution), adhered substances (yeast and a high-molecular substance or sediment component included in a first brewed alcoholic beverage) can be effectively decomposed and removed from the filtration surface of the porous membrane (the surface of the supply side of the first brewed alcoholic beverage).

The "peroxide" is not particularly limited and can be hydrogen peroxide, a percarbonate, or a persulfate.

The structure, material (substance), and manufacturing method of the porous membrane used in the filtration step in the method for manufacturing a brewed alcoholic beverage of the present embodiment will be explained in detail below.

<Porous Membrane>

The porous membrane is any of:

a membrane wherein, in an SEM image of a cross section along the membrane thickness direction of the porous membrane perpendicular to the inside surface of the porous membrane, in each region of the total 4 views: a view comprising the inside surface, a view comprising an outside surface of the membrane, and two views photographed at equal intervals therebetween, the sum total of the areas of resin parts with an area of 1 µm$^2$ or less is 70% or more relative to the overall area of resin parts;

a membrane wherein, in the same regions above, the sum total of the areas of resin parts with an area of 10 µm$^2$ or more is 15% or less relative to the overall area of resin parts;

a membrane wherein, in the same regions above, the sum total of the areas of resin parts with an area of 1 µm$^2$ or less is 70% or more and the sum total of the areas of resin parts with an area of 10 µm$^2$ or more is 15% or less relative to the overall area of resin parts;

and a porous membrane wherein, in the same regions above, the sum total of the areas of resin parts with an area of 1 µm$^2$ or less is 70% or more, the sum total of the areas of resin parts with an area of more than 1 µm$^2$ and less than 10 µm$^2$ is 15% or less, and the sum total of the areas of resin parts with an area of 10 µm$^2$ or more is 15% or less relative to the overall area of resin parts is preferable.

Figure 1:
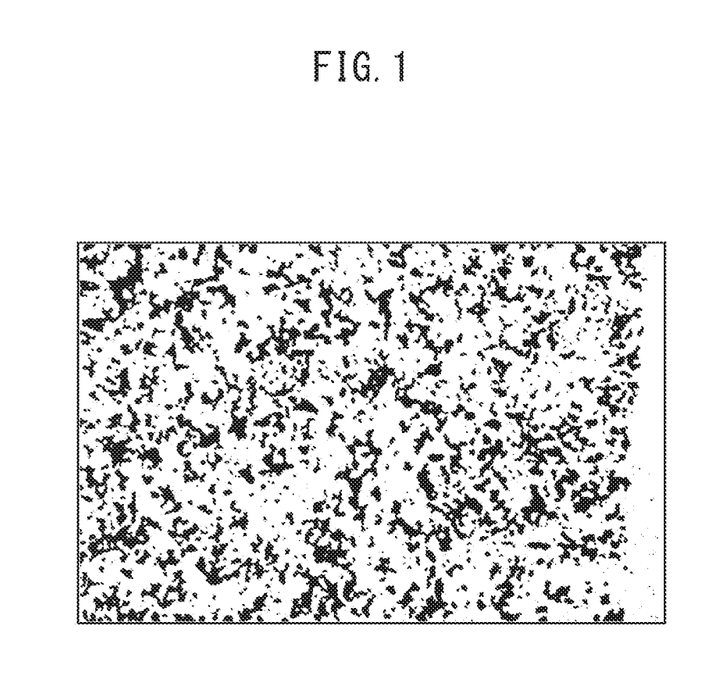
FIG. 1 shows an example of an SEM image (black portion represents resin; white portion represents pores (openings)) of a cross section of the porous membrane used in the method for manufacturing a brewed alcoholic beverage of the present embodiment.
Figure 2:
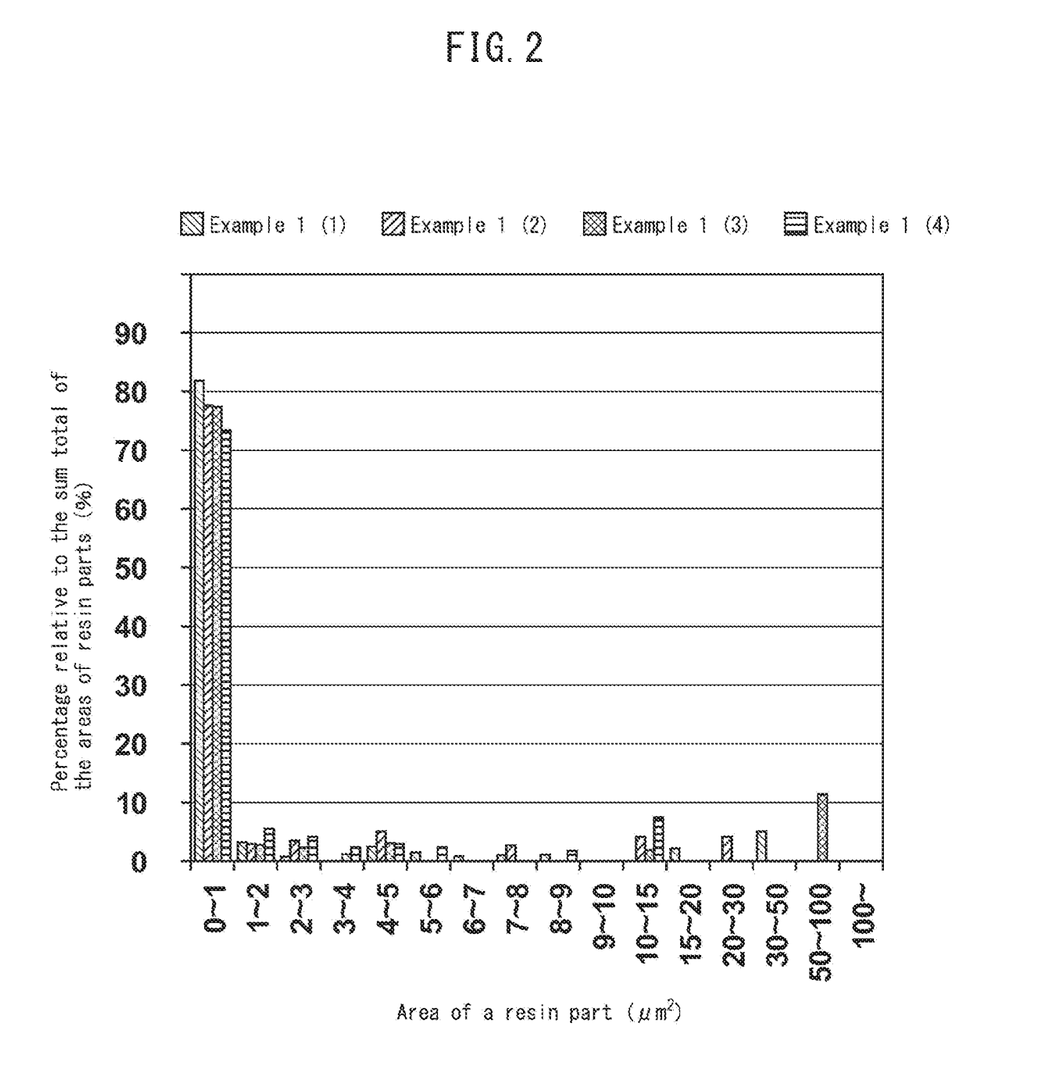
FIG. 2 shows a histogram of the ratios (%) of the sum total of the areas of resin parts having a predetermined area relative to the overall area of the resin parts in each region (parenthetical 1 to parenthetical 4) of a total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membrane used in Example 1.
Figure 3:
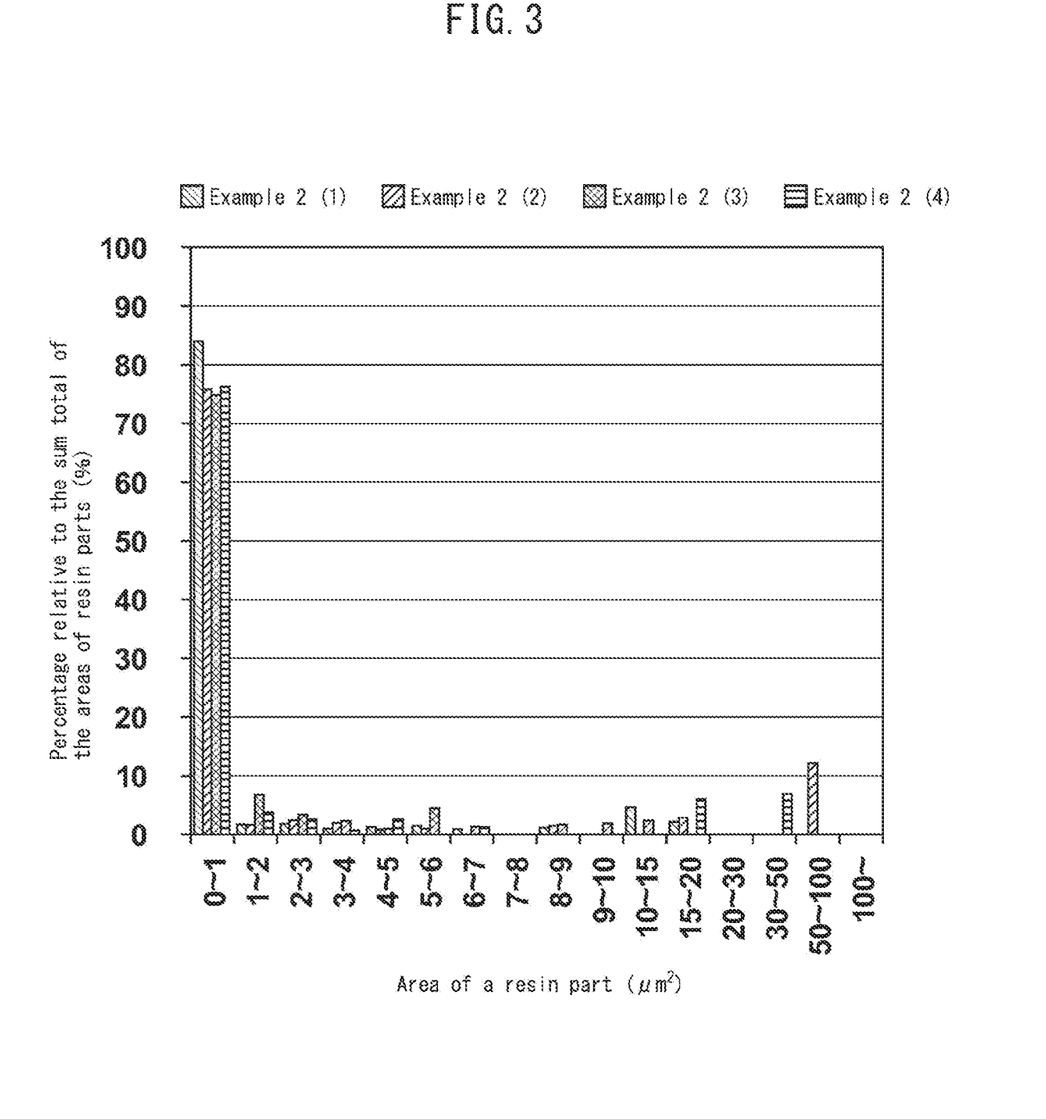
FIG. 3 shows a histogram of the ratios (%) of the sum total of the areas of resin parts having a predetermined area relative to the overall area of the resin parts in each region (parenthetical 1 to parenthetical 4) of a total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membrane used in Example 2.
Figure 4:
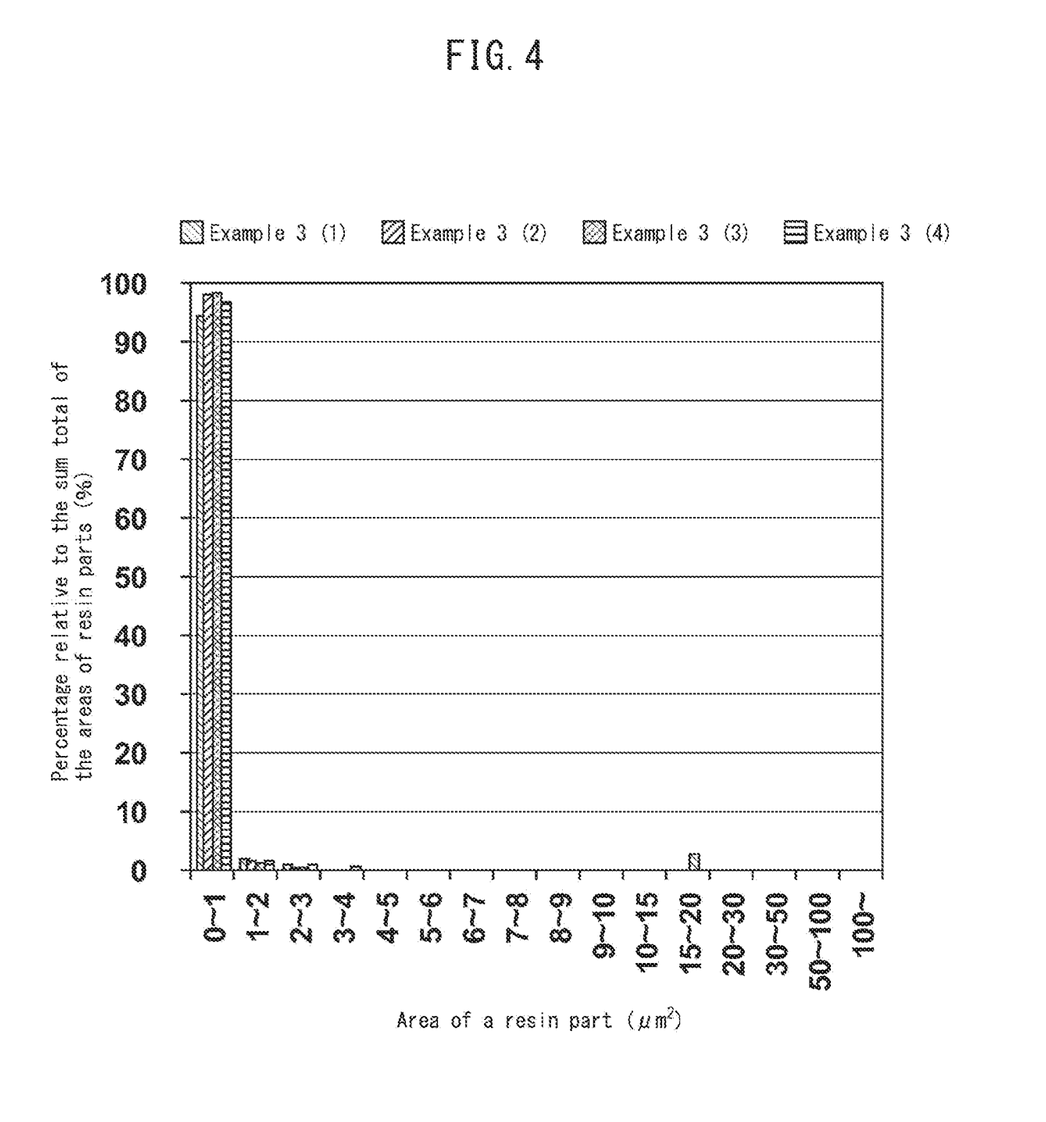
FIG. 4 shows a histogram of the ratios (%) of the sum total of the areas of resin parts having a predetermined area relative to the overall area of the resin parts in each region (parenthetical 1 to parenthetical 4) of a total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membrane used in Example 3.
Figure 5:
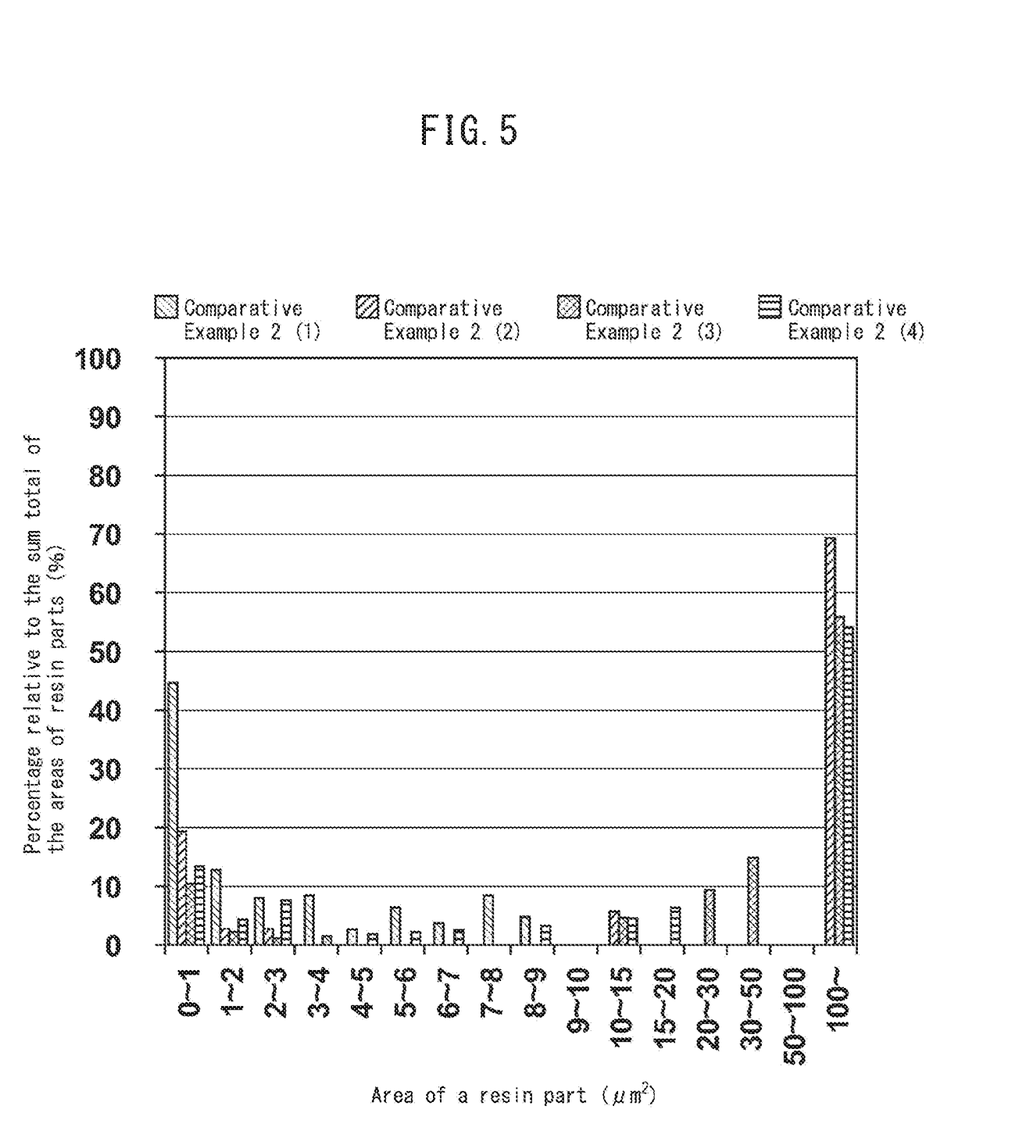
FIG. 5 shows a histogram of the ratios (%) of the sum total of the areas of resin parts having a predetermined area relative to the overall area of the resin parts in each region (parenthetical 1 to parenthetical 4) of a total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membrane used in Comparative Example 2.

FIG. 1 is an example of an SEM image of a cross section of the porous membrane used in the filtration step in the method for manufacturing the brewed alcoholic beverage in the present embodiment. The SEM image is the result of binarization processing of an SEM photograph obtained by photographing predetermined views within the region closest to the inside and the region closest to the inside of the regions of a total 4 views: a view comprising the inside surface, a view comprising an outside surface of the membrane, and two views photographed at equal intervals therebetween, in an SEM image of a cross section along the membrane thickness direction perpendicular to the inside surface of the hollow fiber porous membrane.

In each of the regions above, differences in the distribution of resin parts, i.e., anisotropy of the communication of pores, between the membrane cross section along the membrane thickness direction perpendicular to the inside surface of the hollow fiber porous membrane and the cross section parallel to the inside surface can be practically ignored.

In the present specification, the phrase "resin parts" refers to the dendritic skeleton part of the three-dimensional network structure composed of a resin and forming a plurality of pores in the porous membrane. The parts indicated in black in FIG. 1 are the resin parts; the parts indicated in white are pores.

Inside the porous membrane, communication pores which bend and communicate from the inside to the outside of the membrane are formed. If, in an SEM image of a cross section along the membrane thickness direction of the porous membrane perpendicular to the inside surface of the porous membrane, in each region of the total 4 views: a view comprising the inside surface, a view comprising an outside surface of the membrane, and two views photographed at equal intervals therebetween, the sum total of the areas of resin parts with an area of 1 µm$^2$ or less is 70% or more relative to the overall area of resin parts, the membrane has high pore communication (i.e., percentage of communication pores on the membrane interior is high), flux (permeability) of a solution to be treated (a first brewed alcoholic beverage) is high, permeability retention rate after washing is high, and damage to the membrane after chemical washing as indicated by tensile breaking elongation is reduced. However, if the percentage of the total area of resin parts with an area of 1 µm$^2$ or less is too high relative to the sum total of the areas of resin parts, the dendritic skeleton part of the three-dimensional network structure composed of a resin and which forms a plurality of pores in the porous membrane becomes too fine. Therefore, it is preferable that the sum total of the areas of resin parts with an area of 1 µm$^2$ or less is maintained at 70% or more relative to the overall area of resin parts while the sum total of the areas of resin parts with an area of more than 1 µm² is 2% or more and 30% or less relative to the overall area of resin parts, it is more preferable that the sum total of the areas of resin parts with an area of 10 µm² or more is 15% or less relative to the overall area of resin parts, and it is even more preferable that the sum total of the areas of resin parts with an area of more than 1 µm² and less than 10 µm² is 15% or less relative to the overall area of resin parts, and the sum total of the areas of resin parts with an area of 10 µm² or more is 2% to 15% relative to the overall area of resin parts. If the sum total of the areas of resin parts with an area of more than 1 µm² is 2% to 30% relative to the overall area of resin parts, the dendritic skeleton part of the three-dimensional network structurer composing the resin is not too fine, such that the strength and tensile breaking elongation of the porous membrane can be appropriately maintained.

Histograms of the ratio (%) of the sum total of the areas of resin parts having a specified area relative to the overall area of resin parts in each of the regions (Parenthetical 1 to Parenthetical 4) of a total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membranes used in Example 1, Example 2, Example 3, and Comparative Example 2 are depicted in FIGS. 2 to 5, respectively. FIG. 1 depicts resin parts as granular particles. FIGS. 2 to 5 are histograms of the area percentage of each of the areas of these granular resin parts, for which each area was measured, relative to the overall area of resin parts in the view of a predetermined size in each region. Parenthetical 1 in FIGS. 2 to 5 is the number of the region closest to the inside of the regions of the total 4 views: a view comprising the inside surface, a view comprising an outside surface of the membrane, and two views photographed at equal intervals therebetween, in an SEM image of a cross section along the membrane thickness direction of the porous membrane perpendicular to the inside surface of the porous membrane; parenthetical 4 is the number of the region closest to the inside. For example, Example 1 parenthetical 1 is a histogram from the time of photographing a view of a predetermined size of the region closest to the inside of the porous hollow fiber membrane of Example 1. The method for measuring the area distribution of resin parts within each region of the porous hollow fiber membrane will be described below.

The surface area opening ratio of the porous membrane is preferably 25 to 60%, more preferably 25 to 50%, or even more preferably 25 to 45%. If the surface area opening ratio on the side contacting the liquid to be treated is 25% or more, deterioration of water permeability due to clogs and abraded film surfaces is minimized, such that filtration stability is enhanced. However, if the surface area opening ratio is high, the pores are too big, and there is a risk that the desired function of separation is not demonstrated. Therefore, the average pore size of the porous membrane is preferably 10 to 700 nm, or more preferably 20 to 600 nm. If the average pore size is 30 to 400 nm, the separation function is sufficient, and communication of pores can be achieved. The methods for measuring the surface area opening ratio and average pore size will be described below.

The membrane thickness of the porous membrane is preferably 80 to 1,000 µm, or more preferably, 100 to 300 µm. If the membrane thickness is 80 µm or more, membrane strength can be maintained, and if the membrane thickness is 1,000 µm or less, pressure loss due to membrane resistance is smaller.

The shape of the porous hollow fiber membrane can be an annular single-layer film, or can be a multilayer film having pores different on the separation layer and the support layer supporting the separation layer. Additionally, the shape can be a structure with an irregular cross section having, for example, protrusions on the inside surface and outside surface of the membrane.

(Material for Porous Membrane (Material Quality))

The resin composing the porous membrane is preferably a thermoplastic resin, or more preferably, a fluororesin. The fluororesin can be selected from the group consisting of vinylidene fluoride resin (PVDF), chlorotrifluoroethylene resin, tetrafluoroethylene resin, ethylene-tetrafluoroethylene copolymer (ETFE), ethylene-monochlorotrifluoroethylene copolymer (ECTFE), hexafluoropropylene resin, and mixtures thereof.

The thermoplastic resin can be polysulfone (PS), polyether sulfone (PES), polyolefin, a copolymer of an olefin and a halogenated olefin, halogenated polyolefin, or s mixture thereof. The thermoplastic resin can be, for example, polyethylene, polypropylene, polyvinyl alcohol, ethylene-vinyl alcohol copolymer, ethylene-tetrafluoroethylene copolymer, polyvinylidene fluoride (may include a hexafluoropropylene domain) or s mixture thereof. These resins are thermoplastic and therefore have excellent handleability and are strong, and thus, are excellent as membrane materials. In particular, a vinylidene fluoride resin, tetrafluoroethylene resin, hexafluoropropylene resin, and mixtures thereof; and polymers copolymers, and mixtures of homopolymers and copolymers of ethylene, tetrafluoroethylene, and chlorotrifluoroethylene have excellent mechanical strength, excellent chemical strength (chemical resistance), and good formability, which is preferable. More specifically, the resin can be a fluororesin, such as polyvinylidene fluoride, vinylidene fluoride-hexafluoropropylene copolymer, ethylene-tetrafluoroethylene copolymer, or ethylene-chlorotrifluoroethylene copolymer.

The porous membrane can include up to about 5 mass % of substances (impurities) other than the thermoplastic resin. For example, a solvent used during the manufacture of the porous membrane can be included. As described hereinafter, either or both of a first solvent (hereinafter also referred to as "non-solvent") and a second solvent (hereinafter referred to as "good solvent" or "poor solvent") used as solvents during the manufacture of the porous membrane can be included. These solvents can be detected by thermolytic GC-MS (gas chromatography-mass spectrometry).

The first solvent can be at least one selected from the group consisting of sebacate, citrate, acetyl citrate, adipate, trimellitate, oleate, palmitate, stearate, phosphate, a fatty acid having 6 to 30 carbon atoms, and epoxidized vegetable oil.

Additionally, the second solvent is different than the first solvent, and can be at least one selected from the group consisting of sebacate, citrate, acetyl citrate, adipate, trimellitate, oleate, palmitate, stearate, phosphate, a fatty acid having 6 to 30 carbon atoms, and epoxidized vegetable oil. The fatty acid having 6 to 30 carbon atoms can be capric acid, lauric acid, or oleic acid. Additionally, the epoxidized vegetable oil can be epoxidized soybean oil or epoxidized linseed oil.

The first solvent is preferably a non-solvent, wherein a thermoplastic resin does not dissolve homogenously in the first solvent in a first mixture of the thermoplastic resin and the first solvent in a ratio of 20:80, even if the temperature of the first mixture is raised to the boiling point of the first solvent.

The second solvent is preferably a good solvent, wherein a thermoplastic resin dissolves homogenously in the second solvent in a second mixture of the thermoplastic resin and the second solvent in a ratio of 20:80 at any temperature of the second mixture that is higher than 25° C. and equal to or lower than the boiling point of the second solvent.

The second solvent is preferably a poor solvent, wherein a thermoplastic resin does not dissolve homogenously in the second solvent in a second mixture of the thermoplastic resin and the second solvent in a ratio of 20:80 at a temperature of the second mixture of 25° C., but dissolves homogenously in the second solvent at any temperature of the second mixture that is higher than 100° C. and equal to or lower than the boiling point of the second solvent.

Additionally, in the filtration method of the present embodiment, a porous hollow fiber membrane comprising polyvinylidene fluoride as a thermoplastic resin and containing a first solvent (non-solvent) can used.

In this case, the first solvent is at least one selected from the group consisting of sebacate, citrate, acetyl citrate, adipate, trimellitate, oleate, palmitate, stearate, phosphate, a fatty acid having 6 to 30 carbon atoms, and epoxidized vegetable oil, and can be a non-solvent, wherein polyvinylidene fluoride does not dissolve homogenously in the first solvent in a first mixture of polyvinylidene fluoride and the first solvent in a ratio of 20:80, even if the temperature of the first mixture is raised to the boiling point of the first solvent. The non-solvent is preferably bis-2-ethylhexyl adipate (DOA).

The above porous hollow fiber membrane can include a second solvent different than the first solvent. In this case, the second solvent can be at least one selected from the group consisting of sebacate, citrate, acetyl citrate, adipate, trimellitate, oleate, palmitate, stearate, phosphate, a fatty acid having 6 to 30 carbon atoms, and epoxidized vegetable oil. The second solvent is preferably a good solvent, wherein polyvinylidene fluoride dissolves homogenously in the second solvent in a second mixture of polyvinylidene fluoride and the second solvent in a ratio of 20:80 at any temperature of the second mixture that is higher than 25° C. and equal to or lower than the boiling point of the second solvent. Moreover, the second solvent is preferably a poor solvent, wherein polyvinylidene fluoride does not dissolve homogenously in the second solvent in a second mixture of polyvinylidene fluoride and the second solvent in a ratio of 20:80 at a temperature of the second mixture of 25° C., but dissolves homogenously in the second solvent at any temperature of the second mixture that is higher than 100° C. and equal to or lower than the boiling point of the second solvent. The poor solvent is preferably acetyl tributyl citrate (ATBC).

(Physical Properties of the Porous Membrane)

In the porous membrane, the relationship between the tensile breaking elongation of the porous membrane before the washing step E0 and the tensile breaking elongation of the porous membrane after the washing step E1 is preferably E1/E0×100≥98%. Additionally, the relationship between the tensile breaking elongation of the porous membrane before the washing step E0 and the tensile breaking elongation of the porous membrane after the washing step is repeated X times (X is an integer from 2 to 10) EX is preferably EX/E0×100≥97%.

The initial value of the tensile breaking elongation is preferably 60% or more, more preferably 80% or more, even more preferably 100% or more, or most preferably 120% or more. The method for measuring tensile breaking elongation will be described below.

The resistance (difficulty of causing damage to the membrane) to an aqueous solution (hereinafter, sometimes referred simply to as chemical solution) comprising 0.5 wt % of sodium hypochlorite and 1 wt % of a peroxide can be indicated by the retention rate of tensile breaking elongation before and after circulation washing with a chemical solution (tensile breaking elongation retention rate after chemical solution circulation washing). Specifically, the tensile breaking elongation after the series of steps of circulation washing with the chemical solution has been performed following filtration with the real liquid (corresponding to the tensile breaking elongation of porous hollow fiber membrane after washing step E1) is preferably maintained at 98% or more relative to the initial value (corresponding to the tensile breaking elongation of the membrane before the washing step).

Additionally, the relationship between the initial value E0 and the tensile breaking elongation of the membrane after the series of steps of circulation washing following filtration with the real liquid are performed X times (X is an integer from 2 to 10) EX is preferably EX/E0≥97%.

From the perspective of practical use, the compressive strength of the porous membrane is preferably 0.2 MPa or higher, more preferably 0.3 to 1.0 MPa, or even more preferably 0.4 to 1.0 MPa.

(Water Permeability of Porous Membrane)

In the porous membrane, the flux of the porous membrane before the filtration step L0 and the flux of the porous membrane after the washing step L1 is preferably L1/L0× 100≥80%.

Additionally, in the porous membrane, the flux of the porous membrane before the filtration step L0 and the flux of the porous membrane after the washing step is repeated X times (X is an integer from 2 to 10) L1 is preferably LX/L0×100≥80%.

<Method for Manufacturing the Porous Membrane>

The method for manufacturing the porous hollow fiber membrane will be explained below. However, the method for manufacturing the porous hollow fiber membrane which is used in the filtration method of the present embodiment is not limited to the following method for manufacturing.

The method for manufacturing the porous hollow fiber membrane which is used in the filtration method of the present embodiment can comprise a step of (a) preparing a melt kneaded material, a step of (b) supplying the melt kneaded material to a multiple structure spinning nozzle and extruding the melt kneaded material from the spinning nozzle to obtain a hollow fiber membrane, and a step of (c) extracting a plasticizer from the hollow fiber membrane. If the melt kneaded material comprises an additive, after step (c), a step of (d) extracting the additive from the hollow fiber membrane can be included.

The concentration of thermoplastic resin of the melt kneaded material is preferably 20 to 60 mass %, more preferably 25 to 45 mass %, or even more preferably 30 to 45 mass %. If this value is 20 mass % or higher, mechanical strength is high, and if this value is 60 mass % or lower, water permeability is high. The melt kneaded material can comprise an additive.

The melt kneaded material can consist of two components, the thermoplastic resin and a solvent, or can consist of three components, the thermoplastic resin, an additive, and a solvent. As described below, the solvent includes at least a non-solvent.

The extractant used in step (c) is preferably a liquid, such as methylene chloride or alcohol, which has a high affinity for the plasticizer but does not dissolve the thermoplastic resin.

If a melt kneaded material which does not comprise an additive is used, the hollow fiber membrane obtained via step (c) can be used as the porous hollow fiber membrane. If a porous hollow fiber membrane is manufactured using a melt kneaded material which comprises an additive, it is preferable to proceed through a step (d) of extracting and removing the non-solvent from the hollow fiber membrane after step (c) to obtain a porous hollow fiber membrane. The extractant in step (d) is preferably a liquid, such as hot water, an acid, or an alkali, which can dissolve the additive used, but does not dissolve the thermoplastic resin.

The additive can be an inorganic material. The inorganic material is preferably inorganic powder. The primary particle size of the inorganic powder included in the melt kneaded material is preferably 50 nm or less, or more preferably 5 nm or more and less than 30 nm. Specific examples of an inorganic powder include silica (including fine powder silica), titanium oxide, lithium chloride, calcium chloride, and organoclay. Of these, fine powder silica is preferable from the perspective of cost. The "primary particle size of the inorganic powder" means the value obtained via analysis of an electron micrograph. That is, first, a group of inorganic powder is preprocessed according to the method ASTM D3849. Thereafter, the particle diameters of 3000 to 5000 particles in the transmission electron micrograph are measured, and the arithmetic mean of these values yields the primary particle size of the inorganic powder.

Regarding the inorganic powder inside the porous hollow fiber membrane, by identifying the elements present via X-ray fluorescence, the material (substance) of the inorganic powder present can be identified.

If an organic material is used as the additive, the hollow fiber membrane can be imparted with hydrophilicity by using a hydrophilic polymer such as polyvinyl pyrrolidone or polyethylene glycol. By using an additive with a high viscosity, such as glycerin or ethylene glycol, the viscosity of the melt kneaded material can be controlled.

Next, the step of (a) preparing a melt kneaded material in the method for manufacturing a porous hollow fiber membrane of the present embodiment will be described in detail.

In the method for manufacturing the porous hollow fiber membrane of the present embodiment, a non-solvent of the thermoplastic resin is mixed with a good solvent or a poor solvent. The mixed solvent after mixing is the non-solvent of the thermoplastic resin that is used. If a non-solvent is used as a starting material of the membrane, a porous hollow fiber membrane having a three-dimensional network structure is obtained. The mechanism of action thereof is not necessarily clear, but using a solvent which has a lower solubility due to inclusion of a non-solvent suitably inhibits crystallization of the polymer, such that a three-dimensional network structure is more likely to form. For example, the non-solvent, and the poor solvent or good solvent are selected from the group consisting of esters such as phthalates, sebacates, citrates, acetylcitrates, adipates, trimellites, oleates, palmitates, stearates, phosphates, fatty acids having 6 to 30 carbon atoms, and epoxidized vegetable oil.

A solvent that can dissolve the thermoplastic resin at room temperature is called a "good solvent", a solvent that cannot dissolve the thermoplastic resin at room temperature but can dissolve the thermoplastic resin at high temperatures is called a "poor solvent" of the thermoplastic resin, and a solvent that cannot dissolve the thermoplastic resin even at high temperatures is called a "non-solvent". A good solvent, a poor solvent, and a non-solvent can be assessed as follows.

About 8 g of solvent is placed in a test tube with about 2 g of thermoplastic resin, the temperature is raised in steps of about 10° C. up to the boiling point of the solvent in a test tube block heater, the contents of the test tube are mixed with a spatula, and if the thermoplastic resin dissolves, the solvent is assessed as a good solvent or a poor solvent, and if the thermoplastic resin does not dissolve, the solvent is assessed as a non-solvent. If the thermoplastic resin dissolves at a relatively low temperature or 100° C. or lower, the solvent is assessed as a good solvent, and if the thermoplastic does not dissolve unless the temperature is high from 100° C. to the boiling point, the solvent is assessed as a poor solvent.

For example, if polyvinylidene fluoride (PVDF) is used as the thermoplastic resin, and acetyl tributyl citrate (ATBC), dibutyl sebacate or dibutyl adipate is used as the solvent, the PVDF mixes homogenously with these solvents and dissolves at about 200° C. However, if bis(2-ethylhexyl) adipate (DOA), diisononyl adipate, or bis(2-ethylhexyl) sebacate is used as the solvent, PVDF does not dissolve in these solvents, even at the high temperature of 250° C.

If a copolymer of ethylene-tetrafluoroethylene (ETFE) is used as the thermoplastic resin, and diethyl adipate is used as the solvent, ETFE mixes homogenously and dissolves at about 200° C. Alternatively, if bis(2-ethylhexyl) adipate (DIBA) is used as the solvent, ETFE does not dissolve.

If ethylene-monochlorotrifluoroethylene copolymer (ECTFE) is used as the thermoplastic resin, and triethyl citrate is used as the solvent, ECTFE dissolves homogenously at about 200° C., but if triphenyl phosphorous acid (TPP) is used, ECTFE does not dissolve.

EXAMPLES

The present invention will be specifically described below by way of Examples. However, the present invention is not limited thereto. The values of various physical properties in the Examples and Comparative Examples were each found by the following respective methods.

(1) Outer Diameter and Inner Diameter of the Porous Hollow Fiber Membrane

The porous hollow fiber membrane was sliced thinly at a cross section perpendicular to the longitudinal direction using a razor, and the outer diameter and inner diameter thereof were measured using a 100× magnification microscope. For one sample, measurements were taken for cross sections at 60 locations, at 30 mm intervals in the longitudinal direction, and the average values were taken as the outer diameter and inner diameter of the porous hollow fiber membrane.

(2) Electron Microscopy

A ring shape was cut out at a cross section perpendicular to the longitudinal direction of a porous hollow fiber membrane, stained using 10% phosphotungstic acid and osmium tetroxide, and embedded in epoxy resin. Next, after trimming, BIB processing was performed on the test sample cross section, a smooth cross section was created, conductive treatment was performed, and the speculum sample was created. The created speculum sample was photographed at predetermined views with each of the regions (parenthetical 1 to 4 in FIGS. 2 to 5) of 4 views: a view comprising an inside surface of a membrane thickness cross section, a view comprising an outside surface of the membrane, and two views photographed at equal intervals therebetween, using a SU8000 Series electron microscope by Hitachi at a magnification of 5,000 to 30,000 for SEM images of cross sections of the membrane at an acceleration voltage of 1 kV. The measurement can be made while changing the magnification in accordance with the average pore size. Specifically, when the average pore size was 0.1 μm or more, the magnification was set to 5000×, when the average pore size was 0.05 μm to 0.1 μm, 10,000×, and when the average pore size was less than 0.05 μm, 30,000×. The size of the visible area was 2,560×1,920 pixels.

ImageJ was used for image processing, and by performing threshold processing (Image-Adjust-Threshold: Otsu method (select Otsu)) on the SEM image photographed, the image was binarized to pore parts and resin parts.

Surface area opening ratio: The surface area opening ratio was measured by calculating the ratios of resin parts and pore parts in the binarized image. Area distribution of resin parts: the "Analyze Particle" command (Analyze Particle: Size 0.10—Infinity) of ImageJ was used, and the respective sizes of binarized particulate resin parts in the SEM image photographed were measured. The overall area of resin parts in the SEM image was taken to be $\Sigma S$, the area of resin parts 1 μm$^2$ or less was taken to be $\Sigma S$ (<1 μm$^2$), and by calculating $\Sigma S$ (<1 μm$^2$)/$\Sigma S$, the area ratio of resin parts having an area 1 μm$^2$ or less was calculated. In a similar manner, the area ratio of resin parts having an area in a predetermined range was calculated.

Regarding noise removal upon performing the binarization, resin parts having an area less than 0.1 μm$^2$ were removed as noise, such that resin parts having an area 0.1 μm$^2$ or more were taken as the subject of analysis. Noise removal was carried out by performing median filter processing (Process-Filters-Median: Radius: 3.0 pixels).

Additionally, the particulate resin parts cut off by the edge of the SEM image were included in the measurements. "Include Holes" (fill holes) processing was not performed. Shape correction processing from "Snowman" type to "Flat" type, for example, was not performed.

Average pore size: measured using the "Plugins-Bone J-Thickness" command of ImageJ. The space size was defined as the maximum circular size that could fit in a void.

(3) Flux (Water Permeability, Initial Pure Water Flux)

After immersing the porous hollow fiber membrane in ethanol, pure water immersion was repeated a few times, and then, injection needles were inserted into both ends of the roughly 10 cm-long wet hollow fiber membrane, pure water at 25° C. was circulation filtered at a transmembrane pressure of 0.03 MPa, the amount of pure water passing through from the inside surface of the membrane was measured, flux was determined by the following formula:

Initial pure water flux [L/m$^2$/h]=60×(amount of permeated water [L])/{π×(inner diameter of membrane [m])×(effective length of membrane [m])×(measurement time [min])}, and water permeability was evaluated.

The "effective length of membrane" refers to the true membrane length ignoring the parts in which the injection needles are inserted.

(4) Real Liquid Filtration Method

A brewed alcoholic beverage to be filtered as the real liquid, specifically, red wine, was used. The turbidity was 75 NTU, and Brix was 10%.

First, (i) pure water was placed in a circulation container, circulation filtration was performed such that the transmembrane pressure was 0.03 MPa, and permeated water was collected for two minutes and taken as the initial amount of permeated water.

Next, (ii) after removing the water from the tube, 100 mL of red wine was placed in the circulation container, and circulation filtered such that the transmembrane pressure was 0.1 MPa until 90% of the alcohol was collected on the filtrate side.

Next, (iii) after removing the red wine from the tube, pure water was placed in the circulation container, and circulation filtered such that the transmembrane pressure was 0.03 MPa to wash with water.

Next, (iv) after removing the water from the tube, a prepared chemical solution was placed in the circulation container, and after washing with water, the membrane was circulation filtered and then washed with a chemical solution for 30 minutes. An aqueous solution of 1% hydrogen peroxide or 1% sodium percarbonate was used as the chemical solution.

Next, after removing the chemical solution from the tube, pure water was placed in the circulation container, and after washing, was circulation filtered such that the transmembrane pressure was 0.03 MPa, then the effluent permeated water was repeatedly collected at a timing of 10 L/m$^2$, washing was ended when the concentration of hydrogen peroxide in the permeated water was 5 ppm or less and the concentration of sodium percarbonate, and the amount of rinse water was recorded. Additionally, circulation filtration was then performed at the same transmembrane pressure, and permeated water was collected for two minutes, taken as the amount of permeated water and compared with the initial amount of permeated water.

Each parameter is calculated by the following formulas:

Transmembrane pressure={(pressure in)+(pressure out)}/2

Surface area inside membrane [m$^2$]=π×(inner diameter of hollow fiber membrane [m])×(effective length of hollow fiber membrane [m])

Membrane surface linear velocity [m/s]=4×(amount of circulated water [m$^3$/s]/{π×(inner diameter of membrane [m])$^2$}

Additionally, the operations were all performed at 25° C. at a membrane surface linear velocity of 1.0 m/s.

(5) Tensile Breaking Elongation (%)

A porous hollow fiber membrane was used as was as a sample, and tensile breaking elongation was calculated in accordance with JIS K7161. The load and displacement at the time of tensile breaking elongation were measured under the following conditions.

Measurement device: Instron tensile tester (Shimadzu Corporation, AGS-5D)

Chuck interval distance: 5 cm

Elongation speed: 20 cm/min (6) Test of Resistance to an Aqueous Solution Comprising 1 wt % of Hydrogen Peroxide (Chemical Solution)

Following the real liquid filtration described in (4) above, the series of steps of circulation washing with a chemical solution was repeated 10 times. Then, the initial value of tensile breaking elongation (tensile breaking elongation before immersion) was taken as E0, the value of the tensile breaking strength of the porous hollow fiber membrane after the washing step was repeated 10 times was taken as E10, E10/E0 was calculated as the "tensile breaking elongation retention rate (%) after 10 cycles of repeated chemical solution washing", and chemical tolerance was evaluated.

Additionally, the initial pure water permeability was taken as L0 (flux L0), and the permeability after a washing step after the series of steps (4) of circulation washing with a chemical solution was repeated 10 times following was taken filtration of the real liquid as L10 (flux L10), and L10/L0 was calculated as the "permeability retention rate (%) after 10 cycles of repeated chemical solution washing".

Example 1

A melt kneaded material was prepared using 40 mass % of PVDF resin (Kureha Corporation, KF-W #1000) as a thermoplastic resin, 23 mass % of fine powder silica (primary particle size: 16 nm), 32.9 mass % of bis(2-ethylhexyl) adipate (DOA) as a non-solvent, and 4.1 mass % of acetyl tributyl citrate (ATBC, boiling point 343° C.) as a poor solvent. The temperature of the obtained melt kneaded material was 240° C. Using a spinning nozzle having a double tube structure, after an extruded hollow fiber was passed an idling distance of 120 mm, the obtained melt kneaded material was solidified in water at 30° C. such that a porous structure developed according to thermally induced phase separation. The obtained extruded hollow fiber was pulled at a rate of 5 m/min and wrapped as a skein. The wrapped extruded hollow fiber was immersed in isopropyl alcohol, DOA and ATBC were extracted and removed, and then the wrapped extruded hollow fiber was immersed in water for 30 minutes, the hollow fiber membrane was water replaced, and then, immersed in a 20 mass % NaOH aqueous solution at 70° C. for 1 hour. Washing with water was repeated, fine powder silica was extracted and removed, and a porous hollow fiber membrane was created.

The composition, manufacturing conditions and various physical characteristics of the obtained porous membrane are shown in Table 1. The obtained porous hollow fiber membrane had a three-dimensional network structure. Additionally, the membrane had high communication with a high flux (permeability), and fluxes of liquids from batches 1 to 10 of real liquid (time until 90% collected) were from 196 to 216 minutes. The tensile breaking elongation retention rate after chemical immersion was high at 98%, and the tensile breaking elongation retention rate after 10 cycles of repeated chemical solution washing was high at 97%. Furthermore, the permeability retention rate after chemical immersion was 82%, and the permeability retention rate after 10 cycles of repeated chemical solution washing was 83%, such that permeability was maintained, and widening of the pores of the membrane due to chemical solution deterioration was not observed.

Example 2

A melt kneaded material was prepared using 40 mass % of ETFE resin (AGC Inc., TL-081) as a thermoplastic resin, 23 mass % of fine powder silica (primary particle size: 16 nm), 32.9 mass % of bis(2-ethylhexyl) adipate (DOA) as a non-solvent, and 4.1 mass % of diisobutyl adipate (DIBA) as a poor solvent. The temperature of the obtained melt kneaded material was 240° C. Using a spinning nozzle having a double tube structure, after an extruded hollow fiber was passed an idling distance of 120 mm, the obtained melt kneaded material was solidified in water at 30° C. such that a porous structure developed according to thermally induced phase separation. The obtained extruded hollow fiber was pulled at a rate of 5 m/min and wrapped as a skein. The wrapped extruded hollow fiber was immersed in isopropyl alcohol, DOA and DIBA were extracted and removed, and then the wrapped extruded hollow fiber was immersed in water for 30 minutes, the hollow fiber membrane was water replaced, and then, immersed in a 20 mass % NaOH aqueous solution at 70° C. for 1 hour. Washing with water was repeated, fine powder silica was extracted and removed, and a porous hollow fiber membrane was created.

The composition, manufacturing conditions and various physical characteristics of the obtained porous membrane are shown in Table 1. The obtained porous hollow fiber membrane had a three-dimensional network structure. Additionally, the membrane had high communication with a high flux (permeability), and fluxes of liquids from batches 1 to 10 of real liquid (time until 90% collected) were from 196 to 206 minutes. The tensile breaking elongation retention rate after chemical immersion was high at 99%, and the tensile breaking elongation retention rate after 10 cycles of repeated chemical solution washing was high at 98%. Furthermore, the permeability retention rate after chemical immersion was 85%, and the permeability retention rate after 10 cycles of repeated chemical solution washing was 84%, such that permeability was maintained, and widening of the pores of the membrane due to chemical solution deterioration was not observed.

Example 3

A melt kneaded material was prepared using 40 mass % of ECTFE resin (Solvay Specialty Polymers, Halar901) as a thermoplastic resin, 23 mass % of fine powder silica (primary particle size: 16 nm), 32.9 mass % of triphenyl phosphorous acid (TPP) as a non-solvent, and 4.1 mass % of bis(2-ethylhexyl) adipate (DOA) as a poor solvent. The temperature of the obtained melt kneaded material was 240° C. Using a spinning nozzle having a double tube structure, after an extruded hollow fiber was passed an idling distance of 120 mm, the obtained melt kneaded material was solidified in water at 30° C. such that a porous structure developed according to thermally induced phase separation. The obtained extruded hollow fiber was pulled at a rate of 5 m/min and wrapped as a skein. The wrapped extruded hollow fiber was immersed in isopropyl alcohol, TPP and DOA were extracted and removed, and then the wrapped extruded hollow fiber was immersed in water for 30 minutes, the hollow fiber membrane was water replaced, and then, immersed in a 20 mass % NaOH aqueous solution at 70° C. for 1 hour. Washing with water was repeated, fine powder silica was extracted and removed, and a porous hollow fiber membrane was created.

The composition, manufacturing conditions and various physical characteristics of the obtained porous membrane are shown in Table 1. The obtained porous hollow fiber membrane had a three-dimensional network structure. Additionally, the membrane had high communication with a high flux (permeability), and fluxes of liquids from batches 1 to 10 of real liquid (time until 90% collected) were from 194 to 216 minutes. The tensile breaking elongation retention rate after chemical immersion was high at 99%, and the tensile breaking elongation retention rate after 10 cycles of repeated chemical solution washing was high at 97%. Furthermore, the permeability retention rate after chemical immersion was 82%, and the permeability retention rate after 10 cycles of repeated chemical solution washing was 81%, and chemical solution deterioration was not observed.

Comparative Example 1

Except for using only ATBC as the solvent, the membrane was formed in the same manner as in Example 1 to obtain the hollow fiber membrane of Comparative Example 1. The composition, manufacturing conditions, and various physical characteristics of the porous membrane obtained are shown below in Table 1. The obtained porous hollow fiber membrane had a spherulite structure. Additionally, the membrane had low communication with a low flux, and fluxes of liquids from batches 1 to 10 of real liquid (time until 90% collected) from 956 to 1220 minutes. The tensile breaking elongation retention rate after chemical immersion was low at 86%.

Comparative Example 2

Except for using 0% of fine powder silica and using γ-butyrolactone as the solvent, the membrane was formed in the same manner as in Example 1 to obtain the hollow fiber membrane of Comparative Example 2. The composition, manufacturing conditions, and various physical characteristics of the porous membrane obtained are shown below in Table 1. The obtained porous hollow fiber membrane had a spherulite structure. Additionally, the membrane had low communication with a low flux, and fluxes of liquids from batches 1 to 10 of real liquid (time until 90% collected) from 352 to 453 minutes. The tensile break elongation retention rate after chemical immersion was low at 85%.

Comparative Example 3

Except for using DOA as the solvent, the membrane was formed in the same manner as in Example 3 to obtain the hollow fiber membrane of Comparative Example 3. The composition, manufacturing conditions, and various physical characteristics of the porous membrane obtained are shown below in Table 1. The obtained porous hollow fiber membrane had a spherulite structure. Additionally, the membrane had low communication with a low flux, and fluxes of liquids from batches 1 to 10 of real liquid (time until 90% collected) from 987 to 1208 minutes. The tensile breaking elongation retention rate after chemical immersion was low at 88%.

TABLE 1

| | Example 1 | Example 2 | Example 3 | Comparative Example 1 | Comparative Example 2 | Comparative Example 3 |
|---|---|---|---|---|---|---|
| Resin | PVDF KF W#1000 40% | ETFE TL-081 40% | ECTFE Halar901 40% | PVDF KF W#1000 40% | PVDF KF W#1000 40% | ECTFE Halar901 40% |
| Additive | fine powder silica 23% | fine powder silica 23% | fine powder silica 23% | fine powder silica 23% | none | fine powder silica 23% |
| Non-solvent | DOA: 32.9% | DOA: 32.9% | TPP: 32.9% | none | none | none |
| Poor solvent | ATBC: 4.1% | DIBA: 4.1% | DOA: 4.1% | ATBC: 37% | γ-butyrolactone: 60% | DOA: 4.1% |
| Discharge temperature of stock solution [° C.] | 240 | 240 | 240 | 240 | 200 | 240 |
| Coagulation liquid | water | water | water | water | water | water |
| Coagulation liquid temperature [° C.] | 30 | 30 | 30 | 30 | 30 | 30 |
| Idling distance [mm] | 120 | 120 | 120 | 120 | 120 | 120 |
| Average pore size [nm] | 500 | 600 | 400 | 200 | 100 | 100 |
| Pore structure | 3D mesh | 3D mesh | 3D mesh | spherulite | spherulite | spherulite |
| Surface area opening ratio [%] | 30 | 30 | 30 | 20 | 20 | 20 |
| Flux (water permeability) [L/(m² · h)] | 4,000 | 5,000 | 3,500 | 150 | 2,000 | 100 |
| Outer diameter/inner diameter [mm] | 1.2/0.7 | 1.2/0.7 | 1.2/0.7 | 1.2/0.7 | 1.2/0.7 | 1.2/0.7 |
| Tensile breaking elongation [%] | 170 | 160 | 180 | 30 | 40 | 30 |
| Tensile breaking elongation retention rate after chemical immersion E1/E0 [%] | 98 | 99 | 99 | 86 | 85 | 88 |
| Permeability retention rate after chemical immersion L1/L0 [%] | 82 | 85 | 82 | 57 | 53 | 52 |
| Tensile breaking elongation retention rate after 10 cycles of repeated chemical washing E10/E0 [%] | 97 | 98 | 97 | 51 | 54 | 56 |
| Permeability retention rate after 10 cycles of repeated chemical washing L10/L0 [%] | 83 | 84 | 81 | 42 | 43 | 44 |
| Percent of resin 1 µm² or less by image analysis (1) | 82 | 84 | 94 | 18 | 45 | 10 |
| Percent of resin 1 µm² or less by image analysis (2) | 78 | 76 | 98 | 17 | 19 | 19 |
| Percent of resin 1 µm² or less by image analysis (3) | 77 | 75 | 98 | 15 | 10 | 10 |
| Percent of resin 1 µm² or less by image analysis (4) | 73 | 76 | 97 | 14 | 13 | 13 |
| Percent of resin 10 µm² or more by image analysis 1) | 7 | 7 | 3 | 63 | 0 | 87 |
| Percent of resin 10 µm² or more by image analysis (2) | 8 | 15 | 0 | 68 | 75 | 75 |
| Percent of resin 10 µm² or more by image analysis (3) | 13 | 2 | 0 | 55 | 85 | 85 |
| Percent of resin 10 µm² or more by image analysis (4) | 7 | 13 | 0 | 75 | 65 | 65 |
| Flux of batch 1 real liquid (Time (min) until 90% collected) | 216 | 204 | 210 | 956 | 352 | 987 |
| Flux of batch 2 real liquid (Time (min) until 90% collected) | 196 | 206 | 194 | 1167 | 416 | 1208 |
| Flux of batch 10 real liquid (Time (min) until 90% collected) | 204 | 196 | 216 | 1220 | 453 | 1180 |

TABLE 1-continued

| | Example 1 | Example 2 | Example 3 | Comparative Example 1 | Comparative Example 2 | Comparative Example 3 |
|---|---|---|---|---|---|---|
| Chemical used for chemical solution washing | hydrogen peroxide | hydrogen peroxide | sodium percarbonate | hydrogen peroxide | hydrogen peroxide | sodium percarbonate |
| Amount of water when hydrogen peroxide concentration or sodium percarbonate concentration in the rinse water in the permeate after chemical solution washing fell to 5 ppm or lower (L/m$^2$) | 30 | 40 | 30 | 210 | 210 | 220 |

From the above results, it was found that the membrane with good communication has excellent chemical tolerance, excellent filtration performance, and long life.

INDUSTRIAL APPLICABILITY

The filtration step in the method for manufacturing a brewed alcoholic beverage according to the present invention uses a membrane with good pore communication from the inside of the membrane which is the to-be-treated solution side of the porous filtration membrane to the outside of the membrane which is the filtrate side, even when using an aqueous solution comprising 0.01 wt % to 0.5 wt % of sodium hypochlorite or 0.1 wt % to 1 wt % of a peroxide as the washing solution (chemical solution) used in the washing step, deterioration of the membrane can be suppressed to a minimum, and has excellent chemical tolerance, excellent filtration performance, and long life.

The invention claimed is:

1. A method for manufacturing a second brewed alcoholic beverage, comprising:
a filtration, including passing a first brewed alcoholic beverage, which contains a yeast and a high-molecular substance or sediment component produced through fermentation by the yeast, through a porous membrane, which is formed of a resin having a three-dimensional network structure, to thereby separate a second brewed alcoholic beverage from the yeast; and
a washing, including passing a washing solution through the porous membrane or immersing the porous membrane in the washing solution to thereby wash the inside of the porous membrane;
wherein, in an SEM image of a cross section along the membrane thickness direction of the porous membrane perpendicular to the inside surface of the porous membrane, in each region of a total 4 views: a view comprising the inside surface, a view comprising an outside surface of the membrane, and two views photographed at equal intervals therebetween, the total sum of the areas of resin parts with an area of 0.1 μm$^2$ to 1 μm$^2$ amounts to 70% or more relative to the overall area of resin parts, the total of areas of resin parts having an area of more than 1 μm$^2$ and less than 10 μm$^2$ is from 2 to 30% relative to the total area of resin parts, and the total sum of the areas of resin parts with an area of 10 μm$^2$ or larger amounts to 15% or less relative to the total area of resin parts;
the resin constituting the porous membrane is a fluorine resin of a polymer selected from the group consisting of a vinylidene fluoride resin (PVDF), an ethylene-tetrafluoroethylene copolymer (ETFE), and an ethylene-monochlorotrifluoroethylene copolymer (ECTFE);
the washing solution is an aqueous solution containing 0.01 wt % to 0.5 wt % of sodium hypochlorite, or 0.1 wt % to 1 wt % of a peroxide; and
in the washing, the yeast attached to the porous membrane, and a high-molecular substance or sediment component contained in the first brewed alcoholic beverage are removed; wherein
the relationship between the tensile breaking elongation of the porous membrane before the washing E0 and the tensile breaking elongation of the porous membrane after the washing E1 is E1/E0×100≥98%;
the relationship between the tensile breaking elongation of the porous membrane before the washing E0 and the tensile breaking elongation of the porous membrane after the washing is repeated X times (where X is an integer from 2 to 10) EX is EX/E0×100≥97%;
the relationship between the flux of the porous membrane before the filtration L0 and the flux of the porous membrane after the washing L1 is L1/L0×100≥80%; and
the relationship between the flux of the porous membrane before the filtration L0 and the flux of the porous membrane after the washing is repeated X times (where X is an integer from 2 to 10) LX is LX/L0×100≥80%.

2. The method of claim 1, wherein the surface area opening ratio of the porous membrane is 25 to 60%.

3. The method of claim 1, wherein the porous membrane is a hollow fiber membrane.

4. The method of claim 1, wherein the high-molecular substance is selected from a group of proteins, polysaccharides, and complexes thereof.

5. The method of claim 1, wherein the sediment component is a substance made by complexing a protein, a polyphenol, and/or a tannin via fermentation.

6. The method of claim 1, further comprising a rinsing in which, after the washing, the washing solution remaining inside the porous membrane is rinsed with rinse water, wherein the amount of the rinse water used is 50 L/m$^2$ or less per unit area of the porous membrane, and the washing solution is an aqueous solution comprising 0.2 wt % to 0.5 wt % of sodium hypochlorite or 0.5 wt % to 1 wt % of a peroxide.

7. The method of claim 6, wherein the chlorine concentration at the time of completion of the rinsing is 0.1 ppm or less, and in the case that the peroxide is hydrogen peroxide, the hydrogen peroxide concentration is 5 ppm or less, and, in the case that the peroxide is a percarbonate or a persulfate, the concentration of the percarbonate or the persulfate is 5 ppm or less.

* * * * *